United States Patent
Nashiki et al.

(10) Patent No.: US 8,182,898 B2
(45) Date of Patent: May 22, 2012

(54) TOUCH PANEL (75) Inventors: Tomotake Nashiki, Ibaraki (JP); Hideo Sugawara, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 775 days.

(21) Appl. No.: 11/790,129

(22) Filed: Apr. 24, 2007

(65) Prior Publication Data
US 2007/0252825 A1 Nov. 1, 2007

(30) Foreign Application Priority Data
Apr. 27, 2006 (JP) ................................. 2006-123689

(51) Int. Cl.
*D06N 7/04* (2006.01)
*G06F 3/042* (2006.01)

(52) U.S. Cl. ..................... 428/141; 428/143; 178/18.03; 345/173; 345/176

(58) Field of Classification Search .................. 323/904; 428/141; 178/18.01, 18.02, 18.03; 345/173, 345/174, 176, 177
See application file for complete search history.

(56) References Cited

U.S. PATENT DOCUMENTS

| | | | |
|---|---|---|---|
| 4,518,737 A * | 5/1985 | Traut | 524/413 |
| 6,603,085 B2 | 8/2003 | Oya et al. | |
| 6,689,458 B1 * | 2/2004 | Mikoshiba et al. | 428/339 |
| 6,720,955 B2 | 4/2004 | Sugawara et al. | |
| 7,060,320 B1 | 6/2006 | Omoto et al. | |
| 2002/0158853 A1 * | 10/2002 | Sugawara et al. | 345/176 |
| 2005/0269707 A1 * | 12/2005 | Nashiki et al. | 257/759 |
| 2006/0017707 A1 * | 1/2006 | Fukui et al. | 345/173 |
| 2008/0020202 A1 * | 1/2008 | Nashiki et al. | 428/337 |

FOREIGN PATENT DOCUMENTS

| | | |
|---|---|---|
| JP | 11-286067 A | 10/1999 |
| JP | 2002-316378 A | 10/2002 |
| JP | 2002-326301 A | 11/2002 |
| WO | WO 2005106897 A1 * | 11/2005 |

OTHER PUBLICATIONS

Taiwanese Office Action dated Jan. 27, 2011, issued in corresponding Taiwanese Patent Application No. 096108590.

* cited by examiner

*Primary Examiner* — David Sample
*Assistant Examiner* — Nancy Rosenberg
(74) *Attorney, Agent, or Firm* — Westerman, Hattori, Daniels & Adrian, LLP

(57) ABSTRACT

A touch panel of the invention comprises a first panel having a first film base with transparency and a first transparent conductive thin film provided on one surface of the first film base; and a second panel having a second film base with transparency and a second transparent conductive thin film provided on one surface of the second film base, wherein the first panel and the second panel are arranged so as to face each other with a spacer therebetween, in such a manner that the first conductive thin film and the second conductive thin film face each other, wherein the surface of the first conductive thin film has a hardness of 1 GPa or more and a modulus of elasticity of 5 GPa or more, the surface of the second conductive thin film has a center line average roughness (Ra) of 0.3 nm to 1.0 nm, and that of the center line average roughness (Ra) of the surface of the second conductive thin film is smaller than that of the surface of the first conductive thin film. The touch panel has good durability.

35 Claims, 3 Drawing Sheets

TOUCH PANEL

BACKGROUND OF THE INVENTION

1. Field of the Invention

The present invention relates to a touch panel where panels having a conductive thin film provided on a film base are used as upper and lower substrates.

2. Description of the Related Art

Touch panels where bases on which transparent conductive thin films are provided are placed so as to face each other with spacers therebetween are used in such a manner that the above described conductive thin films are used as transparent electrodes. Though conventionally, so-called conductive glass where an indium oxide thin film is formed on a glass as well known for conductive thin films as that described above, it is inferior in terms of flexibility and processability, because the base is a glass, and therefore, it cannot be used for some applications.

Therefore, in recent years, conductive thin films where a variety of plastic films, including polyethylene terephthalate films, are used as the base have been used, because of the benefit in terms of excellent resistance to impact and light weight, in addition to flexibility and processability.

As for conductive thin films where such a film base is used, when input is repeated with a pen or an excessive load is applied by pressing the tip of a pen against the touch panel, the transparent electrode made of a conductive thin film deteriorates or is damaged. In addition, a problem arises, such that the resistance value increases in portions which deteriorate or are damaged, making the life of the touch panel short. That is to say, the conductive thin films make contact with each other when strong pressure is applied at a point from the side of one panel, and therefore, it is desirable for touch panels to have good resistance to this pressure, that is to say, such properties that they are resistant against pressure at localized points, particularly input with a pen.

Thus, attempts have been made to improve film bases on which conductive thin films are provided and which are used in panels, in order to solve the above described problems with touch panels. The present applicant has proposed that a transparent conductive multilayer body where a transparent first dielectric thin film, a transparent second dielectric thin film and a transparent conductive thin film is laminated in this order on one side of a transparent film base, and a transparent base is laminated on the other surface of the above described film base with a transparent pressure-sensitive adhesive layer therebetween be used as a touch panel (see JP-A No. 2002-316378 (pages 2 to 4) and JP-A No. 2002-326301 (pages 2 to 5)). Though touch panels using the transparent conductive multilayer body as that described above have good durability, better durability has been required for touch panels together with the expansion in the market of touch panels.

SUMMARY OF THE INVENTION

In view of the above described situation, an object of the present invention is to provide a touch panel using a panel where a conductive thin film is provided on a film base, which is a touch panel where the conductive thin film has good durability.

The present inventors continued diligent research in order to solve the above described problems, and as a result, found that the above described object can be achieved using the below described touch panel, and thus, completed the present invention.

The present invention relates to a touch panel, comprising:

a first panel having a first film base with transparency and a first transparent conductive thin film provided on one surface of the first film base; and a second panel having a second film base with transparency and a second transparent conductive thin film provided on one surface of the second film base, wherein the first panel and the second panel are arranged so as to face each other with a spacer therebetween, in such a manner that the first conductive thin film and the second conductive thin film face each other, wherein the surface of the first conductive thin film has a hardness of 1 GPa or more and a modulus of elasticity of 5 GPa or more, the surface of the second conductive thin film has a center line average roughness (Ra) of 0.3 nm to 1.0 nm, and the value of the center line average roughness (Ra) of the surface of the second conductive thin film is smaller than that of the surface of the first conductive thin film.

The present invention is based on the finding that the durability of a touch panel can be improved by controlling the hardness, the modulus of elasticity and the center line average roughness (Ra) of the first conductive thin film of the first panel, which is used as an upper plate (pressing side), and the second conductive thin film of the second panel, which is used as a lower plate in the touch panel, so that they are combined with a predetermined relationship. That is to say, it was found that the first conductive thin film and the second conductive thin film, which are placed so as to face each other, can be prevented from deteriorating or being damaged, so that the life of the touch panel becomes long when the hardness and the modulus of elasticity are high in the upper plate and the center line average roughness (Ra) is made small in the lower plate.

It is preferable for the hardness of the surface of the first conductive thin film to be 1 GPa or more, it is more preferable for it to be 1.5 GPa or more, and it is most preferable for it to be 2 GPa or more, and in addition, it is preferable for the modulus of elasticity to be 5 GPa or more, it is more preferable for it to be 8 GPa or more, and it is most preferable for it to be 10 GPa or more. When the first panel has these properties, such obstacles as cracking in the first conductive thin film or inferiority in the electrical resistance value can be prevented even when the first panel is bent, and the durability is excellent, so that the first panel is appropriate for use as an upper plate for a touch panel. In the case where the hardness of the surface of the first conductive thin film is less than 1 GPa or the modulus of elasticity is less than 5 GPa, the durability of the touch panel is insufficient. Here, it is preferable for the upper limit for the hardness of the surface of the above described conductive thin film to be 5 GPa or less, from the point of view of resistance to cracking, and it is more preferable for it to be 4 GPa or less, and likewise, it is preferable for the above described modulus of elasticity to be 20 GPa or less, from the point of view of resistance to cracking, and it is more preferable for it to be 16 GPa or less.

Here, the hardness and the modulus of elasticity of the surface of the above described first conductive thin film can be measured through an indentation test (indenter pressing test) using, for example, a scanning type probe microscope (JSPM-4200, made by JEOL. Ltd). In general, it is necessary in the measurement of the hardness of the thin film for the depth of the indentation created by the indenter to be within approximately one tenth of the thickness of the film. The hardness and the modulus of elasticity of the surface of the second conductive thin film are measured under similar conditions.

In the indentation test, an indenter is pressed against the test object (that is to say, the conductive thin film side of a transparent conductive multilayer body) under a load so that the test object is indented, and an indentation curve (load-depth of indentation curve) is gained. The hardness H of the test object is found from the ratio of the maximum load Pmax to the projection area A of contact between the indenter and the test object at this time using the following formula (1). In addition, the complex modulus of elasticity Er of the test object is found from the initial gradient S of the curve without a load in the indentation curve using the following formula (2). Furthermore, the Young's modulus Es of the test object is found from the Young's modulus Ei of the indenter, the Poisson ratio vi of the indenter and the Poisson ratio vs of the test object using the following formula (3).

Here, β is a constant in the following formula (2). In addition, the indenter is made of diamond, and the Young's modulus Ei thereof is 1,140 GPa and the Poisson ratio is 0.07.

$$H = Pmax/A \quad (1)$$

$$S = (2/\sqrt{\pi}) \cdot Er \cdot \beta \cdot \sqrt{A} \quad (2)$$

$$Er = 1/\{(1-vs2)/Es + (1-vi2)/Ei\} \quad (3)$$

Here, the Poisson ratio vs of the conductive thin film which is the test object is unknown, and therefore, the above described complex modulus of elasticity Er is assumed to be the modulus of elasticity in the present invention. The details of the measurement are described in, for example, W. C. Oliver and G. M. Phar, J. Meter. Res., Vol. 7, No. 6, June 1992, and Handbook of Micro/Nanotribology, and can be measured in accordance with any known method.

Meanwhile, the center line average roughness (Ra) of the surface of the second conductive thin film is 0.3 nm to 1.0 nm, and the value of the center line average roughness (Ra) of the surface of the second conductive thin film is smaller than that of the surface of the first conductive thin film. The second panel (lower plate), where the center line average roughness (Ra) of the surface of the second conductive thin film is controlled, and the first panel (upper plate), where the hardness and the modulus of elasticity of the surface of the first conductive thin film are controlled, are combined, and thereby, the durability can be improved. In the case where the above described center line average roughness (Ra) is less than 0.3 nm, the first panel and the second panel sometimes cause blocking, while in the case where it exceeds 1.0 nm, there is a risk that the first conductive thin film may be damaged, and in either case, the durability is not preferable. It is preferable for the center line average roughness (Ra) of the surface of the second conductive thin film to be 0.4 nm to 0.9 nm. The center line average roughness (Ra) can be measured in accordance with the method described in the embodiments. The center line average roughness (Ra) of the surface of the first conductive thin film can be measured under the same conditions.

The value of the center line average roughness (Ra) of the surface of the first conductive thin film is greater than that of the center line average roughness (Ra) of the surface of the second conductive thin film in the above described touch panel, and it is preferable for the center line average roughness (Ra) of the surface of the first conductive thin film to be 0.7 nm to 2.0 nm, from the point of view of durability. It is preferable for the center line average roughness (Ra) of the surface of the first conductive thin film to be 0.8 nm to 1.8 nm.

It is preferable in the above described touch panel for the values of both the hardness and the modulus of elasticity of the surface of the second conductive thin film to be smaller than the values of the hardness and the modulus of elasticity of the surface of the first conductive thin film, from the point of view of durability. It is preferable for the hardness of the surface of the second conductive thin film to be 0.4 GPa to 2.0 GPa, and it is more preferable for it to be 0.5 GPa to 1.8 GPa. It is preferable for the modulus of elasticity to be 2.0 GPa to 8.0 GPa, and it is more preferable for it to be 2.0 GPa to 6.0 GPa.

In the above described touch panel, a multilayer body where two or more transparent film bases are laminated with a transparent pressure-sensitive adhesive layer therebetween can be used as the first film base.

It is preferable in the above described touch panel for the first conductive thin film to be provided on the first film base with at least one layer of a transparent dielectric thin film therebetween. When the dielectric thin film is provided, the resistance against scratching and the resistance against bending of the first conductive thin film increase, and at the same time, the durability (properties of resistance against pressure at localized points) of the touch panel increases, which is preferable.

It is preferable in the above described touch panel for the dielectric thin film that is closest to the first conductive thin film to be an $SiO_2$ film formed in a dry process. It is appropriate for the $SiO_2$ film to be formed in a dry process as the dielectric thin film which makes contact with the first conductive thin film so that the hardness, the modulus of elasticity and the center line average roughness (Ra) of the surface of the first conductive thin film can be controlled within the above described range.

It is preferable in the above described touch panel for the second conductive thin film to be provided on the second film base with at least one layer of a transparent dielectric thin film therebetween. When a dielectric thin film is provided, the resistance against scratching and the resistance against bending of the second conductive thin film increase, and at the same time, the durability (properties of resistance against pressure at localized points) of the touch panel increases, which is preferable.

It is preferable in the above described touch panel for the dielectric thin film that is closest to the second conductive thin film to be an $SiO_2$ film formed using a wet application method. It is appropriate for the $SiO_2$ film to be formed in a wet application method as the dielectric thin film which makes contact with the second conductive thin film so that the hardness, the modulus of elasticity and the center line average roughness (Ra) of the surface of the second conductive thin film can be controlled within the above described range.

It is preferable in the above described touch panel for the second conductive thin film to be provided on the second film base with a resin layer having a minute uneven form therebetween. The resin layer having a minute uneven form allows Newton's rings in stripe form to be prevented from being created when the touch panel is pressed with a finger. Meanwhile, in the case where a resin layer is provided as described above, conventional transparent conductive films where the uneven form on the transparent conductive layer thin film is controlled have not been able to provide satisfactory durability, while according to the present invention, the properties of the first conductive thin film and the second conductive thin film are controlled as described above and combined so that the durability increases, and therefore, the durability is satisfactory, even in the case where a resin layer is provided as described above.

DESCRIPTION OF THE PREFERRED EMBODIMENTS

Figure 1:
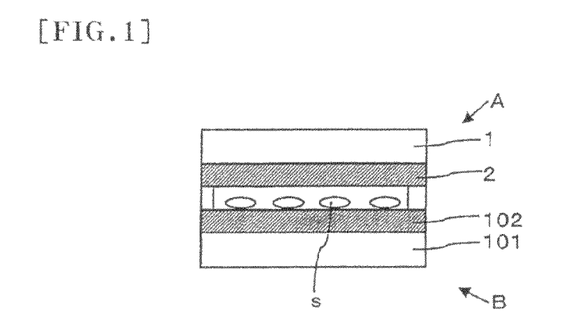
FIG. 1 is a cross sectional diagram showing an example of a touch panel according to the present invention.

In the following, the present invention is described in reference to the drawings. FIG. 1 shows an example of a touch panel where the first panel A and the second panel B are placed so as to face each other with spacers s therebetween, so that the first conductive thin film 2 and the second thin film 102 face each other. The first panel A comprises a transparent first film base 1 and a transparent first conductive thin film 2 which is provided on one surface of this first film base 1. The second panel B comprises a transparent second film base 101 and a transparent second conductive thin film 102 which is provided on one surface of this second film base 101.

In the touch panel of FIG. 1, the first panel A is an upper plate and the second panel B is a lower plate. The touch panel of FIG. 1 functions as a transparent switch structure where, when a localized point on the first panel A is pressed with an input pen, the first conductive thin film 2 and the second conductive thin film 102 make contact with each other and make the electrical circuit of an ON state, while when the above described pressure is released, the electrical circuit returns to the original OFF state.

In the touch panel of FIG. 1, though the first panel A is illustrated as having a first film base 1 and a first conductive thin film 2, for example, the panels shown in FIGS. 2 and 3(A) to 3(C) can be used as the first panel A. In addition, in the touch panel of FIG. 1, though the second panel B is illustrated as having a second film base 101 and a second conductive thin film 102, the panels shown in FIGS. 4 and 5(A) to 5(C) can be used as the second panel B.

Figure 2:
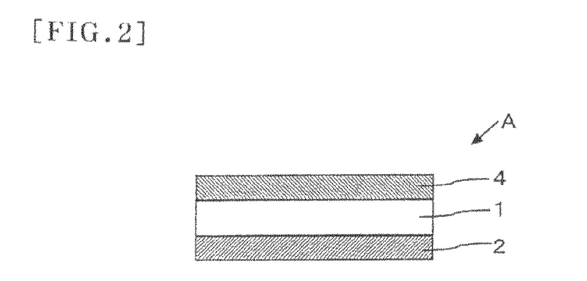
FIG. 2 is a cross sectional diagram showing an example of a first panel according to the present invention.
Figure 3A:
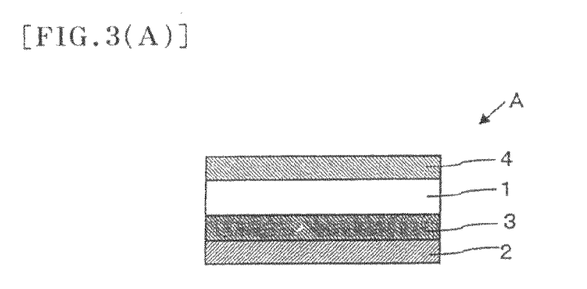
FIG. 3(A) is a cross sectional diagram showing an example of a first panel according to the present invention.
Figure 3B:
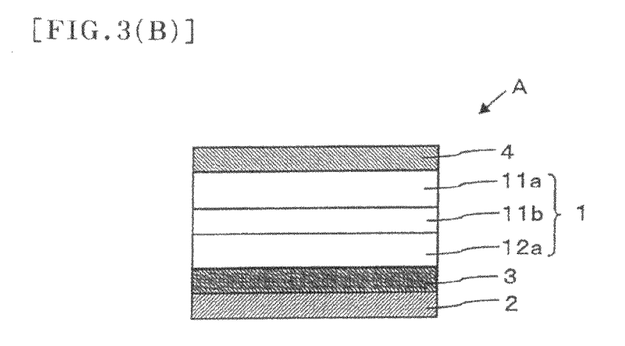
FIG. 3(B) is a cross sectional diagram showing an example of a first panel according to the present invention.
Figure 3C:
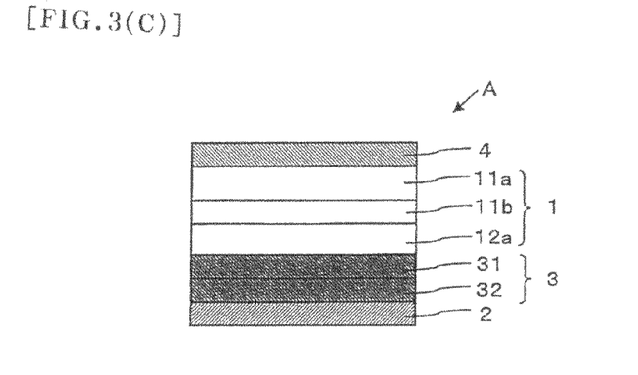
FIG. 3(C) is a cross sectional diagram showing an example of a first panel according to the present invention.
Figure 4:
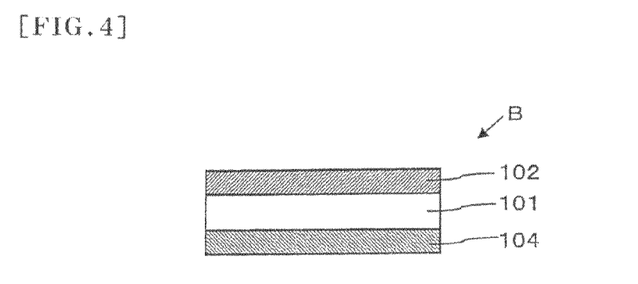
FIG. 4 is a cross sectional diagram showing an example of a second panel according to the present invention.

FIGS. 2 and 3(A) to 3(C) show examples of the first panel A, which comprises a first conductive thin film 2 on one surface of a first film base 1 and a hard coat layer 4 on the opposite side. In FIGS. 3(A) to 3(C), the first conductive thin film 2 is provided with a transparent dielectric thin film 3 therebetween. Two or more layers can be provided instead of one dielectric thin film 3. In FIG. 3(C), thin films are provided in the following order: two layers of dielectric thin films; a dielectric thin film 31 and a dielectric thin film 32, are provided starting from the side of the first film base 1, and then, a first conductive thin film 2 is provided.

In FIGS. 2 and 3(A), one film base 1 is used as the first film base 1. FIGS. 3(B) and 3(C) show examples of a case where a multilayer body 1 where a transparent film base 11a and a transparent film base 12a are laminated together with a pressure-sensitive adhesive layer 11b therebetween is used instead of the film base 1. Though in FIGS. 3(B) and 3(C), two film bases are laminated, the number of layers of film bases may be three or more.

Here, the first panel A of the present application comprises a first film base 1 and a first conductive thin film 2 and, as shown in FIGS. 2 and 3(A) to 3(C), a second conductive thin film 2, as well as a hard coat layer 4 and a dielectric thin film 3, and in addition, an arbitrary number of layers of film bases 1 can be selected in the design.

Figure 5A:
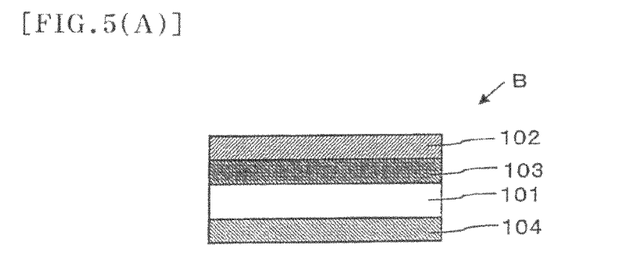
FIG. 5(A) is a cross sectional diagram showing an example of a second panel according to the present invention.
Figure 5B:
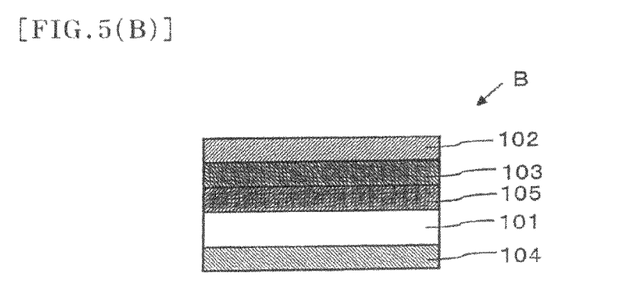
FIG. 5(B) is a cross sectional diagram showing an example of a second panel according to the present invention.
Figure 5C:
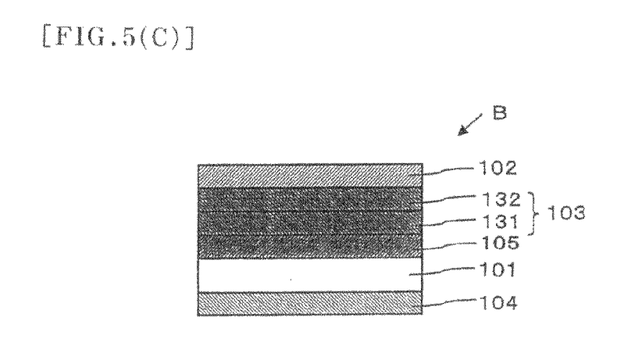
FIG. 5(C) is a cross sectional diagram showing an example of a second panel according to the present invention.

FIGS. 4 and 5(A) to 5(C) show examples of the second panel B, which comprises a first conductive thin film 102 on one surface of a second film base 101 and a hard coat layer 104 on the opposite side. In FIGS. 5(A) to 5(C), the second conductive thin film 102 is provided with a transparent dielectric thin film 103 therebetween. Two or more layers can be provided instead of one dielectric thin film 103. In FIG. 5(C), thin films are provided in the following order: two layers of dielectric thin films; a dielectric thin film 131 and a dielectric thin film 132, are provided starting from the side of the second film base 101, and then, a first conductive thin film 102 is provided.

In addition, as shown in FIGS. 5(B) and 5(C), the second conductive thin film 102 can be provided with a resin layer 105 having a minute uneven form therebetween. As shown in FIG. 5(C), in the case where a dielectric thin film 103 and a resin layer 105 are provided, it is preferable to provide a resin layer 105 and then a dielectric thin film 103 in this order, starting from the side of the second film base 101.

Here, the second panel B of the present application comprises a second film base 101 and a second conductive thin film 102, and a hard coat layer 104, a dielectric thin film 103 and a resin layer 105 as those in FIGS. 4 and 5(A) to 5(C) can be arbitrarily designed. Furthermore, a multilayer body of two or more layers can be provided instead of one film base 101.

The materials for the first film base and the second film base according to the present invention are not particularly limited, and any appropriate material can be used. Concretely, polyester-based resins, acetate-based resins, polyether sulfone-based resins, polycarbonate-based resins, polyamide-based resins, polyimide-based resins, polyolefin-based resins, acryl-based resins, polyvinyl chloride-based resins, polystyrene-based resins, polyvinyl alcohol-based resins, polyarylate-based resins, polyphenylene sulfide-based resins, polyvinylidene chloride-based resins, (meth)acryl-based resins and the like can be cited. From among these, polyester-based resins, polycarbonate-based resins and polyolefin-based resins are particularly preferable.

It is preferable for the thickness of the first film base to be approximately 75 µm to 400 µm. It is more preferable for it to be 100 µm to 200 µm. In the case where the thickness of the first film base is smaller than 75 µm, there are problems with the durability and the processability. In the case where the thickness of the first film base is greater than 400 µm, the touch panel portion becomes large, and in addition, application of a heavy load becomes necessary, due to the input properties of the touch panel, which is not preferable.

In addition, in the case where the first film base is a multilayer body of two or more transparent film bases, an appropriate thickness and material can be selected for the respective film bases, and it is preferable for at least one to be 20 μm to 125 μm.

In the case where the first film base is a multilayer body of transparent film bases, any pressure-sensitive adhesive layer may be used, without any particular limitations, as long as it is transparent. Acryl-based pressure-sensitive adhesives, silicone-based pressure-sensitive adhesives and rubber-based pressure-sensitive adhesives, for example, can be used. The pressure-sensitive adhesive layer has a function of improving the resistance against scratching of the first conductive thin film which is provided on one surface of a film base, as well as properties of resistance against pressure at localized points for the touch panel due to the cushioning effects after the laminating of the film bases. It is preferable for the modulus of elasticity of the pressure-sensitive adhesive layer to be in a range from 1 N/cm$^2$ to 100 N/cm$^2$, and for the thickness to be set to 1 μm or more, more so in a range from 5 μm to 100 μm.

In the case where the above described modulus of elasticity is less than 1 N/cm$^2$, the pressure-sensitive adhesive layer becomes inelastic, and therefore, easily deforms when pressure is applied, so as to make the first film base, and in addition, the first conductive thin film, uneven, it becomes easy for the pressure-sensitive adhesive to stick out from the end surface which is created in the cutting process, and furthermore, the effects of improving the resistance against scratching of the first conductive thin film and properties of resistance against pressure at localized points of the touch panel are reduced. Meanwhile, in the case where the modulus of elasticity exceeds 100 N/cm$^2$, the pressure-sensitive adhesive layer becomes hard and cushioning effects cannot be expected for the pressure-sensitive adhesive layer, and therefore, the resistance against scratching of the first conductive thin film and the properties of resistance against pressure at localized points of the touch panel cannot be improved. In addition, in the case where the thickness of the pressure-sensitive adhesive layer is less than 1 μm, cushioning effects cannot be expected for the pressure-sensitive adhesive layer, and therefore, the resistance against scratching of the first conductive thin film and the properties of resistance against pressure at localized points of the touch panel cannot be expected to improve. Conversely, in the case where the thickness is great, transparency is lost, and sometimes formation of the pressure-sensitive adhesive layer or pasting of the film bases becomes difficult, and no good results are gained in terms of cost.

Though the thickness of the second film base is not particularly limited, it is preferable for it to be in a range from 2 μm to 300 μm, and it is particularly preferable for it to be in a range from 10 μm to 130 μm. In the case where the thickness is less than 2 μm, there is a risk that the mechanical strength may be insufficient for the film base and the operation of continuously forming a thin film, for example the second conductive thin film, by preparing the base in roll form becomes difficult. In addition, in the case where the thickness exceeds 300 μm, it becomes easy for a problem to arise with the rolling properties, and there is a risk that the process for rolling the transparent conductive thin film may become difficult.

An etching process, such as sputtering, corona discharge, scorching, irradiation with ultraviolet rays, irradiation with electron beams, chemical synthesis or oxidation, or a process for under coating is carried out in advance on the surfaces of the above described first film base and the second film base, so that the pressure-sensitive adhesiveness may be increased between the film base and a conductive thin film, a hard coat layer, a dielectric thin film or a resin layer having a minute uneven form which is provided on top of the film base. In addition, dust removal and cleaning may be carried out through cleaning with a solvent or cleaning with ultrasonic waves, if necessary.

The material for the thin film which is used in the formation of the first conductive thin film or the second conductive thin film is not particularly limited, and any appropriate material from which a transparent conductive film can be formed can be selected for use. Metals, such as gold, silver, platinum, palladium, copper, aluminum, nickel, chromium, titanium, iron, cobalt, tin and alloys of these, metal oxides, such as indium oxide, tin oxide, titanium oxide, cadmium oxide and mixtures of these, and other metal compounds, such as copper iodine, for example, can be used. The above described conductive thin film may be either a crystal layer or a non-crystal layer. Indium oxide containing tin oxide, tin oxide containing antimony and the like are preferably used as the above described material.

As for the method for forming the above described conductive thin film, an appropriate method for forming a thin film can be selected from among a variety of methods, such as a vacuum vapor deposition method, a sputtering method, an ion plating method, a spray thermal decomposition method, a chemical plating method, an electrical plating method and a method where any of these are combined. It is preferable to adopt a vacuum vapor deposition method or a sputtering method as the above described method for forming a thin film, from the point of view of speed of formation for the conductive thin film, the possibility of forming a film having a large area, productivity and the like.

An appropriate thickness can be determined for the above described conductive thin film in accordance with the purpose when used. The thickness is usually 10 nm to 300 nm, preferably in a range from 10 nm to 200 nm. In the case where the thickness is smaller than 10 nm, it becomes difficult to gain a continuous coating film having such a good conductivity that the surface electrical resistance is no higher than $1 \times 10^3$ Ω/□, and in the case where the thickness is too great, the transparency is easily lost.

The value of the hardness, the modulus of elasticity, the center line average roughness (Ra) of the surface of the first conductive thin film and the second conductive thin film is controlled within the above described range. Though the method for controlling this is not particularly limited, control is possible by, for example, providing a conductive thin film on the above described film base with a transparent dielectric thin film therebetween. The dielectric thin film can be provided as one or more layers. The dielectric thin film can be formed of an inorganic substance, an organic substance or a mixture of an inorganic substance and an organic substance.

As the inorganic material for forming the dielectric thin film, inorganic substances, such as NaF, Na$_3$AlF$_6$, LiF, MgF$_2$, CaF$_2$, BaF$_2$, SiO$_2$, LaF$_3$, CeF$_3$ and Al$_2$O$_3$ can be cited as examples.

In addition, the dielectric thin film can be formed of a composite oxide having a high refractive index where indium oxide contains a specific amount of tin oxide and cerium oxide. It is preferable for the ratio of tin oxide in the above described compound oxide to be 0 weight parts to 20 weight parts relative to 100 weight parts of indium oxide, from the point of view of the optical properties. Furthermore, it is preferable for it to be 3 weight parts to 15 weight parts. In addition, it is preferable for the ratio of cerium oxide to be 10 weight parts to 40 weight parts relative to 100 weight parts of indium oxide, from the point of view of a high resistance value (insulating properties) and the optical properties. Furthermore, it is preferable for it to be 15 weight parts to 30 weigh parts. It is preferable to use a sintered body of a mixture having the respective oxide components as the material for formation.

Organic substances, such as acryl resins, urethane resins, melamine resins, alkyd resins, siloxane-based polymers, can be cited as the organic substance for forming the dielectric thin film. In particular, it is desirable to use a thermosetting resin made of a mixture of a melamine resin, an alkyd resin and an organic silane condensate as the organic substance.

The above described dielectric thin film can be formed by a dry process, for example a vacuum vapor deposition method, a sputtering method or an ion plating method, using the above described materials. In addition, it can be formed by a wet application method where an application liquid is applied in accordance with an appropriate method, such as fountain, die coating, casting, spin coating, fountain metalling or gravure.

Though an appropriate thickness is determined for the above described dielectric thin film on the basis of the material to be used, it is usually preferably 10 nm to 300 nm, and it is further preferable for it to be in a range from 10 nm to 200 nm. In the case where two or more layers are provided in the dielectric thin film, it is preferable for the total thickness to be controlled within the above described range.

It is appropriate in the first panel to control the properties on the surface of the first conductive thin film by forming the $SiO_2$ film which is the dielectric thin film closest to the first conductive thin film in accordance with a dry process, in order to control the properties within the above described range. As the dry process, a vacuum vapor deposition method is appropriate, because control of the surface roughness and the strength is easy.

Though the thickness of the $SiO_2$ film (dielectric thin film closest to the first conductive thin film) which is formed by a dry process as described above is not particularly limited, it is preferable for it to be 10 nm or more, so that it can be made a continuous coating film and the transparency and resistance against scratching can be improved, it is more preferable for it to be 10 nm to 120 nm, and it is most preferable for it to be 15 nm to 60 nm.

In the case where two or more layers are provided in the dielectric tin film in the first panel, an appropriate material, method for formation and thickness can be selected for the dielectric thin film from within the above described range.

It is appropriate in the second panel to control the properties on the surface of the second conductive thin film by forming the $SiO_2$ film which is the dielectric thin film closest to the second conductive thin film in accordance with a wet application method, in order to control the properties within the above described range. In the wet application method, silica sol or the like is appropriate for use, and gravure coating is appropriate, from the point of view of productivity.

Though the thickness of the $SiO_2$ film (dielectric thin film closest to the first conductive thin film) which is formed by a wet application method as described above is not particularly limited, it is preferable for it to be 10 nm or more, so that it can be made a continuous coating film and the transparency and resistance against scratching can be improved, it is more preferable for it to be 10 nm to 120 nm, and it is most preferable for it to be 15 nm to 60 nm.

In the case where two or more layers are provided in the dielectric tin film in the second panel, an appropriate material, method for formation and thickness can be selected for the dielectric thin film from within the above described range. From among these, it is preferable for the dielectric thin film to be formed of a composite oxide having a high refractive index where indium oxide includes a specific amount of tin oxide and cerium oxide, in that a dielectric thin film having excellent optical properties, such as transparency, can be fabricated with high productivity. Though the thickness of the dielectric thin film which is formed of a complex oxide is not particularly limited, it is preferable for it to be 10 nm to 200 nm. It is more preferable for it to be 15 nm to 60 nm.

In addition, in the second panel, the second conductive thin film can be provided on the second film base with a resin layer having a minute uneven form therebetween.

The method for forming the resin layer having a minute uneven form is not particularly limited, and any appropriate method can be adopted. A method for forming the surface of the material of the resin layer to a minute uneven form by carrying out a coarsening process on the surface of the film that is used for the formation of the above described resin layer in advance in accordance with an appropriate method, such as sandblasting, emboss rolling or chemical etching, can be cited as an example. In addition, a method for providing a minute uneven form on the surface of the resin layer which is separately applied on the resin layer and processed in accordance with a transcribing method using a die can be cited. In addition, a method for providing a minute uneven form by making the resin layer contain dispersed minute particles can be cited. Two or more of these methods for forming a minute uneven form may be combined, so that a layer where surfaces having minute uneven forms in different states are combined can be formed. From among the methods for forming the above described resin layer, a method for providing a resin layer containing dispersed minute particles is preferable, from the point of view of ease of formation of a surface having a minute uneven form.

In the following, a method for providing a resin layer by dispersing minute particles is described. As the resin for forming the resin layer, resins in which it is possible to disperse minute particles and which have sufficient strength as a coating film after formation of the resin layer, as well as transparency, can be used without any particular limitations. As the above described resin, thermosetting resins, thermoplastic resins, ultraviolet ray curing resins, electron beam curing resins and mixed resins of two liquids, can be cited, and from among these, ultraviolet ray curing resins from which the resin layer can be efficiently formed through a simple processing operation in a hardening process through irradiation with ultraviolet rays are preferable.

As ultraviolet ray curing resins, a variety of resins, such as polyester-based resins, acryl-based resins, urethane-based resins, amide-based resins, silicone-based resins and epoxy-based resins can be cited, and ultraviolet ray curing monomers, oligomers and polymers are included. As ultraviolet ray curing resins which are preferable for use, resins having a functional group for polymerization using ultraviolet rays, particularly resins containing acryl-based monomers or an oligomer component having two or more, particularly three to six, of such functional groups, can be cited. In addition, an ultraviolet ray polymerization initiator is mixed in with ultraviolet ray curing resins.

Additives, such as leveling agents, thixotropic agents and antistatic agents, can be used for the material for the resin layer, in addition to the above described materials. Use of a thixotropic agent is advantageous for the formation of protruding particles on the surface of the minute uneven form. As the thixotropic agent, silica, mica and the like of which the particles are 0.1 μm or less can be cited. An appropriate content for these additives is generally approximately 15 weight parts or less, preferably 0.1 weight parts to 15 weight parts, relative to 100 weight parts of the ultraviolet ray curing resin.

A variety of metal oxides, materials having transparency, such as glass and plastic, can be used as the minute particles without any particular limitations. In organic minute particles, such as silica, alumina, titania, zirconia and calcium oxide, as well as cross linked or non-cross linked organic minute particles made of any of a variety of polymers, such as polymethyl methacrylate, polystyrene, polyurethane, acryl-based resins, acryl-styrene copolymers, benzoguanamine, melamine or polycarbonate, and silicone-based minute particles can be cited as examples. One or two more appropriate types from among the ad minute particles can be selected for use, but organic minute particles are preferable. As organic minute particles, acryl-based resins are preferable, from the point of view of the refractive index.

Usually minute particles, of which the average particle diameter is in a range from approximately 1 μm to 10 μm, preferably from approximately 1 μm to 4 μm, can be used. In addition, minute particles having different particle diameters can be combined for use.

The method for forming a resin layer containing minute particles is not particularly limited, and any appropriate method can be adopted. A resin layer is formed in such a manner that, for example, a resin containing minute particles (for example an application liquid of an ultraviolet ray curing resin) is applied on the above described transparent film base, and after this is dried, a curing process is carried out, so that an uneven form is created on the surface. Here, the application liquid is applied in accordance with an appropriate method, such as fountaining, die coating, casting, spin coating, fountain metalling or gravure.

Though the ratio of the minute particles included in the above described application liquid is not particularly limited, 0.1 weight parts to 20 weight parts, particularly 0.1 weight parts to 10 weight parts, relative to 100 weight parts of the resin is preferable to form a surface having a minute uneven form.

Though the thickness of the resin layer is not particularly limited, approximately 0.5 μm to 7 μm, particularly 0.5 μm to 2 μm, is preferable, from the point of view of the cracking and curling properties. The thickness of the resin layer has a value which is calculated from the material used for the formation of the resin layer and the area of application. Here, in the case where an application liquid is used for the formation of the resin layer, the film thickness of the resin layer can be found from the difference in the weight before and after application of the application liquid.

A hard coat layer can be provided on the surface of the first film base, on the side where the first conductive thin film is not provided, and on the surface of the second film base, on the side where the second conductive thin film is not provided. The hard coat layer can be formed by carrying out a hard coat process on the above described surface of the film base. The hard coat process can be carried out in accordance with a method for carrying out a hardening process on the applied hard resin, for example, the acryl urethane-based resin or the siloxane-based resin.

When a hard coat layer is formed, in the case where the thickness is too small, the hardness becomes insufficient, while in the case where the thickness is too great, cracking sometimes occurs. In addition, it is preferable for the thickness of the hard coat layer to be approximately 0.1 μm to 30 μm, taking such properties that curling can be prevented into consideration.

In addition, in the first film base, a non-glare surface can be formed at the same time as the hard coat process, in order to prevent reflection due to the mirror effect when a silicone resin or the like is mixed with a hard resin as the acryl urethane-based resin or siloxane-based resin so that the surface becomes roughness, which is practical when used in touch panels and the like. Furthermore, a reflection preventing layer or an antifouling layer can be formed together with the hard coat layer or separately from the hard coat layer.

EXAMPLES

In the following, the examples of the present invention are described in comparison with comparative examples, and thus, concretely described. Here, in the following, "parts" means weight parts.

Example of Manufacture 1

(Fabrication of First Panel A1)

A cured film having a thickness of 150 nm made of a thermosetting resin where melamine resin:alkyd resin:organic silane condensate=2:2:1 (weight ratio) was formed on one surface of a first transparent film base made of a polyethylene terephthalate film (hereinafter, referred to as PET film) having a thickness of 23 μm through gravure coating (shown as Si coating in Table 1). This is referred to as first transparent dielectric thin film.

Next, an $SiO_2$ film having a thickness of 30 nm was formed on the above described first dielectric thin film in accordance with a vacuum vapor deposition method. This is referred to as second transparent dielectric thin film.

Furthermore, a transparent conductive thin film (ITO thin film) having a thickness of 23 nm was formed from a composite oxide of indium oxide and tin oxide on the above described second dielectric thin film in accordance with a sputtering method using a sintered body of a mixture of indium oxide and tin oxide (97 wt % of indium oxide and 3 wt % of tin oxide) in an atmosphere of $4 \times 10^{-3}$ Pa of 80% argon gas and 20% oxygen gas.

Next, a transparent acryl-based pressure-sensitive adhesive layer (acryl-based pressure-sensitive adhesive where 1 part of an isocyanate-based cross linking agent was mixed with 100 parts of a copolymer of a monomer mixture where the weight ratio of butyl acrylate:acrylic acid:vinyl acetate was 100:2:5) of which the modulus of elasticity was adjusted to 10 $N/cm^2$ was formed on the other surface of the above described PET film so as to have a thickness of approximately 20 μm, and furthermore, a transparent base made of a PET film having a thickness of 125 μm was laminated on top of this.

Next, a toluene solution of 100 parts of an acryl urethane-based resin (trade name: "Unidic 17-806," made by Dainippon Ink and Chemicals Incorporated) to which 5 parts of hydroxycyclohexyl phenyl ketone (trade name: "Irgacure 184," made by Ciba Specialty Chemicals) was added as a photopolymerization initiator was distilled to a concentration of 50 wt %, applied to the above described transparent base and dried for three minutes at 100° C., and immediately after, irradiated with ultraviolet rays from two ozone type high pressure mercury lamps (light collecting type; 80 W/cm; 15 cm), so that a hard coat layer having a thickness of 5 μm was formed, and thus, a first panel A1 having the structure shown in FIG. 3(C) was fabricated.

Example of Manufacture 2

(Fabrication of First Panel A2)

A first panel A2 was fabricated in the same manner in Example of Manufacture 1, except that the thickness of the $SiO_2$ film was changed to 70 nm as in Example of manufacture 1.

Example of Manufacture 3

(Fabrication of First Panel A3)

A first panel A3 was fabricated in the same manner in Example of Manufacture 1, except that an SiOx film (x: 1.8) having a thickness of 15 nm was formed by a vacuum vapor deposition method instead of forming a hard coating film of a thermosetting having a thickness of 150 nm as the first dielectric thin film as in Example of manufacture 1.

Example of Manufacture 4

(Fabrication of First Panel A4)

A first panel A4 was fabricated in the same manner in Example of Manufacture 1, except that a second dielectric thin film having a thickness of 30 nm was formed from an $SiO_2$ thin film in accordance with a silica coating method instead of forming an $SiO_2$ film having a thickness of 30 nm as the second dielectric thin film in accordance with a vacuum vapor deposition method as in Example of Manufacture 1, and the thickness of the conductive thin film (ITO thin film) was changed to 21 nm. Here, in accordance with the silica coating method, a solution of silica sol ("Colcoat P," made by Colcoat Co., Ltd.) distilled with ethanol so that the solid concentration became 2% was applied on the first dielectric thin film through gravure coating and dried for two minutes at 150° C., and after that, cured, so that a thin film was formed.

Example of Manufacture 5

(Preparation of Application Liquid)

A mixture of 0.5 parts of a monodisperse filler (material: cross linked acryl-based resin, standard deviation:0.22 μm, grade of product made by Soken Chemical & Engineering Co., Ltd.: type MX) having an average particle diameter of 2.2 μm and 0.1 parts of a monodisperse filler (material: cross linked acryl-based resin, standard deviation: 0.3 μm, grade of product made by Soken Chemical & Engineering Co., Ltd.: type MX) having an average particle diameter of 3 μm was used for the minute particles. A solution where the mixture of the minute particles, 100 weight parts of an ultraviolet ray curing resin (acryl urethane-based resin, trade name: Unidic 17-806, made by Dainippon Ink and Chemicals Incorporated), 5 weight parts of a photopolymerization initiator (trade name: Irgacure 184, made by Ciba Specialty Chemicals) and a solvent (toluene) where the solid component was measured and found to be 50 wt % were mixed was prepared.

(Fabrication of Second Panel B1)

The above described application liquid was applied on one surface of a transparent film base made of a PET film having a thickness of 100 μm using a wire bar so that the thickness of the application after being dried became 1.1 μm, and after that dried for three minutes at 100° C. and then, a curing process was carried out through irradiation with ultraviolet rays, so that a resin layer having a surface in minute uneven form was formed.

Next, a transparent first dielectric thin film having a thickness of 23 nm was formed from a compound oxide having 100 parts of tin oxide and 25 parts of cerium oxide relative to 10 parts of indium oxide on the above described resin layer in accordance with a reactive sputtering method using a sintered body of a mixture of 100 parts of indium oxide, 10 parts of tin oxide and 25 parts of cerium oxide in an atmosphere of a mixed gas of 95% argon gas and 0.5% oxygen gas under the following conditions.

<Conditions for Sputtering>
target size: 200 mm×500 mm
output: 3.0 kw
voltage value: 450 V
time for discharge: 1 min
degree of vacuum: 0.5 Pa Next, a second dielectric thin film was formed from an $SiO_2$ thin film on the above described first dielectric thin film in accordance with a silica coating method. Here, in accordance with the silica coating method, a solution of silica sol ("Colcoat P," made by Colcoat Co., Ltd.) distilled with ethanol so that the solid concentration became 2% was applied on the first dielectric thin film through gravure coating and dried for two minutes at 150° C., and after that, cured, so that an $SiO_2$ thin film having a thickness of 55 nm was formed. This is referred to as second transparent dielectric thin film.

Furthermore, a transparent conductive thin film (ITO thin film) having a thickness of 23 nm was formed from a compound oxide of indium oxide and tin oxide on the above described second dielectric thin film in accordance with a sputtering method using a sintered body of a mixture of indium oxide and tin oxide (97 wt % of indium oxide and 3 wt % of tin oxide) in an atmosphere of $4 \times 10^{-3}$ Pa of 80% argon gas and 20% oxygen gas.

Next, a toluene solution of 100 parts of an acryl urethane-based resin (trade name: "Unidic 17-806," made by Dainippon Ink and Chemicals Incorporated) to which 5 parts of hydroxycyclohexyl phenyl ketone (trade name: "Irgacure 184," made by Ciba Specialty Chemicals) was added as a photopolymerization initiator was distilled to a concentration of 50 wt %, applied to the opposite side of the above described PET film (side on which conductive thin film is not provided) and dried for three minutes at 100° C., and immediately after, irradiated with ultraviolet rays from two ozone type high pressure mercury lamps (light collecting type; 80 W/cm; 15 cm), so that a hard coat layer having a thickness of 5 μm was formed, and thus, a second panel B1 having the structure shown in FIG. 5(C) was fabricated.

Example of Manufacture 6

(Fabrication of Second Panel B2)

A second panel B2 was fabricated in the same manner in Example of Manufacture 5, except that the thickness of the second dielectric thin film was changed to 15 nm in Example of Manufacture 5.

Example of Manufacture 7

(Fabrication of Second Panel B3)

A second panel B3 was fabricated in the same manner in Example of Manufacture 5, except that the thickness of the second dielectric thin film was changed to 50 nm in Example of Manufacture 5.

Example of Manufacture 8

(Fabrication of First Panel B4)

A second panel B4 was fabricated in the same manner in Example of Manufacture 1, except that a second dielectric thin film was formed from an $SiO_2$ thin film having a thickness of 55 nm in accordance with a vacuum vapor deposition method instead of forming an $SiO_2$ film having a thickness of 55 nm in accordance with a silica coating method as the second dielectric thin film in Example of Manufacture 1.

The properties (hardness, modulus of elasticity, center line average roughness (Ra)) on the conductive thin film side were measured for the first panels A1 to A4 which were gained in Examples of Manufacture 1 to 4 and the second panels B1 to B4 which were obtained in Examples of Manufacture 5 to 8 in accordance with the following method. The results are shown in Table 1.

Figure 6:
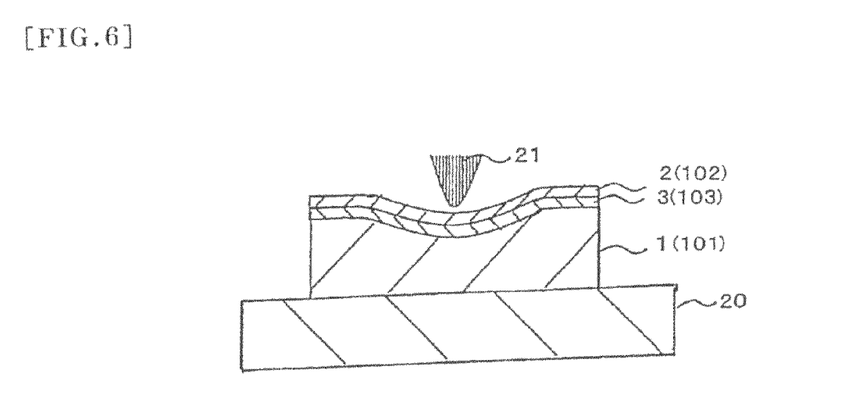
FIG. 6 is a diagram schematically illustrating the measurement of the hardness and the modulus of elasticity of the surface of the first conductive thin film and the second conductive thin film.

Here, a multilayer body where neither a pressure-sensitive adhesive layer nor a transparent base were provided on the rear surface of the film base (PET film), that is to say, a multilayer body as shown in FIG. 6 where a conductive thin film (ITO thin film) 2 (102) was formed on one surface of the film base 1 (101) with a dielectric thin film 3 (103) therebetween, was used as a test body at the time of measurement of the above described hardness and modulus of elasticity.

<Hardness and Modulus of Elasticity of Conductive Thin Film Side>

The hardness and the modulus of elasticity of the conductive thin film side were measured in an indentation test in accordance with the method described in detail in the present specification. That is to say, as shown in FIG. 6, a test body was secured to a sample support 20 so that the conductive thin film (ITO thin film) 2 (102) faced upward. An indenter 21 was pressed against the conductive thin film 2 (102) side in the above described secured state with a load applied in the vertical direction, and thus, an indentation curve (load-depth of indentation curve) was obtained. As a result, the hardness and the modulus of elasticity of the conductive thin film side could be calculated on the basis of the above described formulas (1) and (2).

A scanning type probe microscope (JSPM-4200, made by JEOL. Ltd) was used for the measurement. In addition, a diamond indenter (triangular pyramid) (TI-037 90°) was used as the indenter 21. Using this indenter, one indentation (pressing of indenter) was made for three seconds in the vertical direction under a load of 20 μN, and one sample was measured five times and the average value was found. There was a sufficient distance between the measured portions, so that the indentations did not affect each other in the measurement.

<Center Line Average Roughness (Ra)>

The center line average roughness (Ra) was found through observation using an AFM. For the measurement, 1 μm☐ was scanned with a probe (made of $Si_3N_4$) in a contact mode using SPI 3800, made by Seiko Instruments Inc.

Example 1

The first panel A1 obtained in the above described Example of Manufacture 1 was used as an upper plate and the second panel B1 gained in Example of Manufacture 5 was used as a lower plate, and these two panel plates were placed in such a manner that the ITO thin films faced each other and the gap between the two panel plates with spacers having a thickness of 20 μm became 150 μm, and thus, a touch panel was fabricated as a switch structure. Here, the ITO thin films on the two panel plates were formed in advance so as to be perpendicular to each other before the above described plates were placed in such a manner as to face each other.

Examples 2 to 5 and Comparative Examples 1 to 5

A touch panel was fabricated in the same manner as in Example 1, except that the upper plate and the lower plate used in the touch panel in Example 1 were changed as shown in Table 1.

The resistance against input with a pen was measured for the respective touch panels obtained in the above described examples and comparative examples in accordance with the following method. The results are shown in Table 1.

<Resistance to Input with Pen under Heavy Load>

A pen made of polyacetal (tip of pen R: 0.8 mm) was slid 100,000 times under a load of 1.5 kg on the panel plate side formed of a transparent conductive multilayer body. After sliding, the linearity was measured in the following manner, and the resistance to input with a pen under a heavy load was evaluated.

[Method for Measuring Linearity]

A voltage of 5 V was applied to the transparent conductive multilayer body, so that the output voltage between a terminal A (point where measurement was started) and a terminal B (point where measurement was completed) through which a voltage was applied was measured in the transparent conductive multilayer body.

The linearity was found through the following calculation, where the output voltage at the point A where measurement is started was $E_A$, the output voltage at the point B where measurement was finished is $E_B$, the output voltage at the point X of measurement is Ex and the theoretical value is Exx.

$$Exx \text{ (theoretical value)} = \{X \cdot (E_B - E_A)/(B-A)\} + E_A$$

$$\text{linearity (\%)} = [(Exx - Ex)/(E_B - E_A)] \times 100$$

Figure 7:
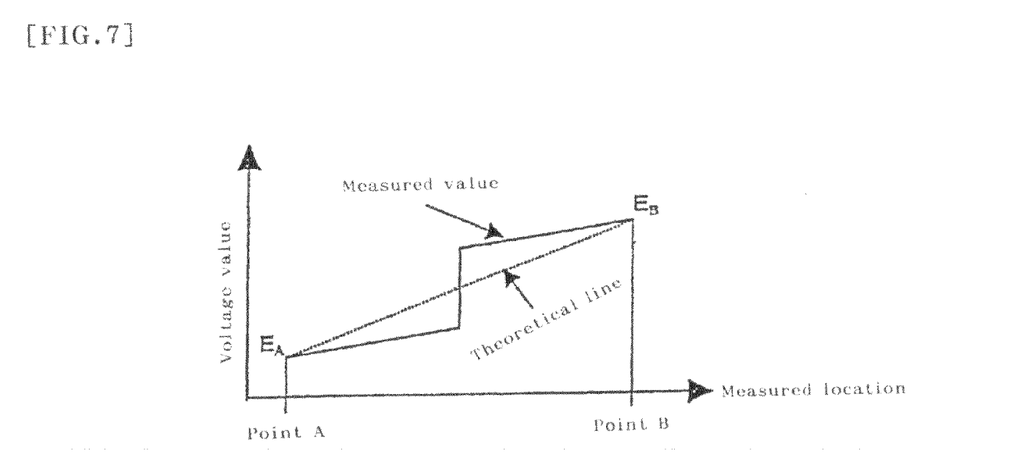
FIG. 7 is a graph schematically illustrating the measurement of the linearity.

Here, the outline of measurement of linearity is shown in FIG. 7. In image displays using a touch panel, what location on the screen is pointed at by the pen is determined from the value of resistance in the portion where the upper panel and the lower panel make contact when pressed with a pen. The value of the resistance is determined on the presupposition that the distribution in the output voltage on the surface of the upper and lower panels is the theoretical line (ideal line). Then, the actual location of the pen and the location of the pen on the screen which is determined by the value of resistance are not the same in the case where the voltage value does not follow the theoretical line, as in the measured value in FIG. 7. The difference from the theoretical line is the linearity, and the greater this value is, the greater the difference between the location of the actual pen and the pen on the screen becomes.

TABLE 1

| | | first panel (upper plate) | | | | | | | |
|---|---|---|---|---|---|---|---|---|---|
| | | Configuration | | | | | | properties | |
| | | | second dielectric thin film | | first dielectric thin film | | | | |
| | type | thickness of ITO film (nm) | method for forming $SiO_2$ | thickness (nm) | method for formation | thickness (nm) | Ra (nm) | hardness (GPa) | modulus of elasticity (GPa) |
| Example 1 | A1 | 23 | dry | 30 | Si coating | 150 | 0.9 | 2.9 | 12.4 |
| Example 2 | A2 | 23 | dry | 70 | Si coating | 150 | 1.3 | 2.9 | 12.4 |
| Example 3 | A1 | 23 | dry | 30 | Si coating | 150 | 0.9 | 2.9 | 12.4 |
| Example 4 | A3 | 23 | dry | 30 | SiO*x* | 15 | 1.5 | 2.9 | 12.4 |
| Example 5 | A3 | 23 | dry | 30 | SiO*x* | 15 | 1.5 | 2.9 | 12.4 |
| Comparative Example 1 | A4 | 21 | wet | 30 | Si coating | 150 | 0.5 | 0.6 | 4.7 |
| Comparative Example 2 | A4 | 21 | wet | 30 | Si coating | 150 | 0.5 | 0.6 | 4.7 |

TABLE 1-continued

| | | | | | | | | | |
|---|---|---|---|---|---|---|---|---|---|
| Comparative Example 3 | A4 | 21 | wet | 30 | Si coating | 150 | 0.5 | 0.6 | 4.7 |
| Comparative Example 4 | A1 | 23 | dry | 30 | Si coating | 150 | 0.9 | 2.9 | 12.4 |
| Comparative Example 5 | A3 | 23 | dry | 30 | SiOx | 15 | 1.5 | 2.9 | 12.4 |

| | second panel (lower plate) | | | | | | | | |
|---|---|---|---|---|---|---|---|---|---|
| | | | configuration | | | | properties | | |
| | | | second dielectric thin film | | first dielectric thin film | | | | |
| | type | thickness of ITO film (nm) | method for forming SiO$_2$ | thickness (nm) | method for formation | thickness (nm) | Ra (nm) | hardness (Gpa) | modulus of elasticity (Gpa) | resistance (%) |
| Example 1 | B1 | 23 | wet | 55 | dry | 23 | 0.5 | 0.6 | 4.7 | 1.0 |
| Example 2 | B1 | 23 | wet | 55 | dry | 23 | 0.5 | 0.6 | 4.7 | 1.0 |
| Example 3 | B2 | 23 | wet | 15 | dry | 23 | 0.8 | 0.6 | 4.7 | 1.5 |
| Example 4 | B3 | 23 | wet | 50 | dry | 23 | 0.5 | 0.6 | 4.7 | 1.0 |
| Example 5 | B2 | 23 | wet | 15 | dry | 23 | 0.8 | 0.6 | 4.7 | 1.5 |
| Comparative Example 1 | B1 | 23 | wet | 55 | dry | 23 | 0.5 | 0.6 | 4.7 | 5.0 |
| Comparative Example 2 | B2 | 23 | wet | 15 | dry | 23 | 0.8 | 0.6 | 4.7 | 10.0 |
| Comparative Example 3 | B4 | 23 | dry | 55 | dry | 23 | 1.6 | 2.9 | 12.4 | 10.0 |
| Comparative Example 4 | B4 | 23 | dry | 55 | dry | 23 | 1.6 | 2.9 | 12.4 | 10.0 |
| Comparative Example 5 | B4 | 23 | dry | 55 | dry | 23 | 1.6 | 2.9 | 12.4 | 10.0 |

What is claimed is:

1. A touch panel, comprising:
a first panel having a first film base with transparency and a first transparent conductive thin film provided on one surface of the first film base; and
a second panel having a second film base with transparency and a second transparent conductive thin film provided on one surface of the second film base,
wherein the first panel and the second panel are arranged so as to face each other with a spacer therebetween, in such a manner that the first conductive thin film and the second conductive thin film face each other,
wherein the surface of the first conductive thin film has a hardness of 1 GPa or more and a modulus of elasticity of 5 GPa or more,
the surface of the second conductive thin film has a center line average roughness (Ra) of 0.3 nm to 1.0 nm, and
the value of the center line average roughness (Ra) of the surface of the second conductive thin film is smaller than that of the surface of the first conductive thin film, wherein the center line average roughness (Ra) was measured with scanned 1 μm square,
wherein the first panel is used as an upper plate, the second panel is used as a lower plate and the upper plate is present on the pressing side of the touch panel.

2. The touch panel according to claim 1, wherein the center line average roughness (Ra) of the surface of the first conductive thin film is 0.7 nm to 2.0 nm, wherein the center line average roughness (Ra) was measured with scanned 1 μm square.

3. The touch panel according to claim 1, wherein the values of the hardness and the modulus of elasticity of the surface of the second conductive thin film are both smaller than the values of the hardness and the modulus of elasticity of the surface of the first conductive thin film.

4. The touch panel according to claim 1, wherein the hardness of the surface of the second conductive thin film is 0.4 GPa to 2.0 GPa and the modulus of elasticity is 2.0 GPa to 8.0 GPa.

5. The touch panel according to claim 1, wherein the first film base is a multilayer body where two or more transparent film bases are laminated together with a transparent pressure-sensitive adhesive layer therebetween.

6. A touch panel, comprising:
a first panel having a first film base with transparency and a first transparent conductive thin film provided on the first film base with at least one layer of a transparent dielectric thin film therebetween; and
a second panel having a second film base with transparency and a second transparent conductive thin film provided on one surface of the second film base,
wherein the first panel and the second panel are arranged so as to face each other with a spacer therebetween, in such a manner that the first conductive thin film and the second conductive thin film face each other,
wherein the surface of the first conductive thin film has a hardness of 1 GPa or more and a modulus of elasticity of 5 GPa or more,
the surface of the second conductive thin film has a center line average roughness (Ra) of 0.3 nm to 1.0 nm, and
the value of the center line average roughness (Ra) of the surface of the second conductive thin film is smaller than that of the surface of the first conductive thin film, wherein the center line average roughness (Ra) was measured with scanned 1 μm square,
wherein the first panel is used as an upper plate, the second panel is used as a lower plate and the upper plate is present on the pressing side of the touch panel.

7. The touch panel according to claim 6, wherein the dielectric thin film that is closest to the first conductive thin film is an SiO$_2$ film formed by a dry process.

8. A touch panel, comprising:
a first panel having a first film base with transparency and a first transparent conductive thin film provided on one surface of the first film base; and
a second panel having a second film base with transparency and a second transparent conductive thin film provided on the second film base with at least one layer of a transparent dielectric thin film therebetween; and
wherein the first panel and the second panel are arranged so as to face each other with a spacer therebetween, in such a manner that the first conductive thin film and the second conductive thin film face each other,
wherein the surface of the first conductive thin film has a hardness of 1 GPa or more and a modulus of elasticity of 5 GPa or more,
the surface of these conductive thin film has a center line average roughness (Ra) of 0.3 nm to 1.0 nm, and
the value of the center line average roughness (Ra) or the surface of the second conductive thin film is smaller than that of the surface of the first conductive thin film, wherein the center line average roughness (Ra) was measured with scanned 1 μm square,
wherein the first panel is used as an upper plate, the second panel is used as a lower plate and the upper plate is present on the pressing side of the touch panel.

9. The touch panel according to claim 8, wherein the dielectric thin film that is closest to the second conductive thin film is an $SiO_2$ film formed by a wet application method.

10. The touch panel according to claim 1, wherein the second conductive thin film is provided on the second film base with a resin layer therebetween, the resin layer contains minute particles and a resin, the average particle diameter of the minute particles is in a range from approximately 1 μm to 10 μm, and the ratio of minute particles is 0.1 weight parts to 20 weight parts relative to 100 weight parts of the resin.

11. A touch panel comprising:
a first panel having a first film base with transparency and a first transparent conductive thin film provided on the first film base with at least one layer of a transparent dielectric thin film therebetween; and
a second panel having a second film base with transparency and a second transparent conductive thin film provided on the second film base with at least one layer of a transparent dielectric thin film therebetween; and
wherein the first panel and the second panel are arranged so as to face each other with a spacer therebetween, in such a manner that the first conductive thin film and the second conductive thin film face each other,
wherein the surface of the first conductive thin film has a hardness of 1 GPa or more and a modulus of elasticity of 5 GPa or more,
the surface of the second conductive thin film has a center line average roughness (Ra) of 0.3 nm to 1.0 nm, and
the value of the center line average roughness (Ra) of the surface of the second conductive thin film is smaller than that of the surface of the first conductive thin film, wherein the center line average roughness (Ra) was measured with scanned 1 μm square,
wherein the first panel is used as an upper plate, the second panel is used as a lower plate and the upper plate is present on the pressing side of the touch panel.

12. The touch panel according to claim 11, wherein the dielectric thin film that is closest to the first conductive thin film is an $SiO_2$ film formed by a dry process, and the dielectric thin film that is closest to the second conductive thin film is an $SiO_2$ film formed by a wet application method.

13. The touch panel according to claim 1, wherein the hardness of the surface of the second conductive thin film is 0.4 GPa to 2.0 GPa and the modulus of elasticity is 2.0 GPa to 6.0 GPa.

14. The touch panel according to claim 10, wherein a thickness of the resin layer is 0.5 μm to 7 μm.

15. The touch panel according to claim 6, wherein the center line average roughness (Ra) of the surface of the first conductive thin film is 0.7 nm to 2.0 nm, wherein the center line average roughness (Ra) was measured with scanned 1 μm square.

16. The touch panel according to claim 6, wherein the values of the hardness and the modulus of elasticity of the surface of the second conductive thin film are both smaller than the values of the hardness and the modulus of elasticity of the surface of the first conductive thin film.

17. The touch panel according to claim 6, wherein the hardness of the surface of the second conductive thin film is 0.4 GPa to 2.0 GPa and the modulus of elasticity is 2.0 GPa to 8.0 GPa.

18. The touch panel according to claim 6, wherein the first film base is a multilayer body where two or more transparent film bases are laminated together with a transparent pressure-sensitive adhesive layer therebetween.

19. The touch panel according to claim 6, wherein the hardness of the surface of the second conductive thin film is 0.4 GPa to 2.0 GPa and the modulus of elasticity is 2.0 GPa to 6.0 GPa.

20. The touch panel according to claim 6, wherein the second conductive thin film is provided on the second film base with a resin layer therebetween, the resin layer contains minute particles and a resin, the average particle diameter of the minute particles is in a range from approximately 1 μm to 10 μm, and the ratio of minute particles is 0.1 weight parts to 20 weight parts relative to 100 weight parts of the resin.

21. The touch panel according to claim 20, wherein a thickness of the resin layer is 0.5 μm to 7 μm.

22. The touch panel according to claim 8, wherein the center line average roughness (Ra) of the surface of the first conductive thin film is 0.7 nm to 2.0 nm, wherein the center line average roughness (Ra) was measured with scanned 1 μm square.

23. The touch panel according to claim 8, wherein the values of the hardness and the modulus of elasticity of the surface of the second conductive thin film are both smaller than the values of the hardness and the modulus of elasticity of the surface of the first conductive thin film.

24. The touch panel according to claim 8, wherein the hardness of the surface of the second conductive thin film is 0.4 GPa to 2.0 GPa and the modulus of elasticity is 2.0 GPa to 8.0 GPa.

25. The touch panel according to claim 8, wherein the first film base is a multilayer body where two or more transparent film bases are laminated together with a transparent pressure-sensitive adhesive layer therebetween.

26. The touch panel according to claim 8, wherein the hardness of the surface of the second conductive thin film is 0.4 GPa to 2.0 GPa and the modulus of elasticity is 2.0 GPa to 6.0 GPa.

27. The touch panel according to claim 8, wherein the second conductive thin film is provided on the second film base with a resin layer therebetween, the resin layer contains minute particles and a resin, the average particle diameter of the minute particles is in a range from approximately 1 μm to 10 μm, and the ratio of minute particles is 0.1 weight parts to 20 weight parts relative to 100 weight parts of the resin.

28. The touch panel according to claim 27, wherein a thickness of the resin layer is 0.5 μm to 7 μm.

29. The touch panel according to claim 11, wherein the center line average roughness (Ra) of the surface of the first conductive thin film is 0.7 μm to 2.0 μm, wherein the center line average roughness (Ra) was measured with scanned 1 μm square.

30. The touch panel according to claim 11, wherein the values of the hardness and the modulus of elasticity of the surface of the second conductive thin film are both smaller than the values of the hardness and the modulus of elasticity of the surface of the first conductive thin film.

31. The touch panel according to claim 11, wherein the hardness of the surface of the second conductive thin film is 0.4 GPa to 2.0 GPa and the modulus of elasticity is 2.0 GPa to 8.0 GPa.

32. The touch panel according to claim 11, wherein the first film base is a multilayer body where two or more transparent film bases are laminated together with a transparent pressure-sensitive adhesive layer therebetween.

33. The touch panel according to claim 11, wherein the hardness of the surface of the second conductive thin film is 0.4 GPa to 2.0 GPa and the modulus of elasticity is 2.0 GPa to 6.0 GPa.

34. The touch panel according to claim 11, wherein the second conductive thin film is provided on the second film base with a resin layer therebetween, the resin layer contains minute particles and a resin, the average particle diameter of the minute particles is in a range from approximately 1 μm to 10 μm, and the ratio of minute particles is 0.1 weight parts to 20 weight parts relative to 100 weight parts of the resin.

35. The touch panel according to claim 34, wherein a thickness of the resin layer is 0.5 μm to 7 μm.

\* \* \* \* \*